United States Patent [19]

Hideg et al.

[11] Patent Number: 4,578,747
[45] Date of Patent: Mar. 25, 1986

[54] SELECTIVE PARAMETRIC SELF-CALIBRATING CONTROL SYSTEM

[75] Inventors: Laszlo Hideg, Dearborn Heights; Paul L. Koller, Wyandotte, both of Mich.

[73] Assignee: Ford Motor Company, Dearborn, Mich.

[21] Appl. No.: 553,323
[22] PCT Filed: Oct. 14, 1983
[86] PCT No.: PCT/US83/01606
§ 371 Date: Oct. 14, 1983
§ 102(e) Date: Oct. 14, 1983
[87] PCT Pub. No.: WO85/01807
PCT Pub. Date: Apr. 25, 1985

[51] Int. Cl.[4] .............................................. G05B 13/04
[52] U.S. Cl. ..................................... 364/151; 364/155; 364/157; 364/165; 318/561
[58] Field of Search ............... 364/149, 150, 151, 152, 364/153, 157, 165, 155; 318/561

[56] References Cited
U.S. PATENT DOCUMENTS

| | | | |
|---|---|---|---|
| 3,466,430 | 9/1969 | Hardaway | 364/155 |
| 3,510,635 | 5/1970 | Rouxel et al. | 364/155 |
| 3,828,171 | 8/1974 | Griffin | 364/151 |
| 3,891,836 | 6/1975 | Lee | 364/151 |
| 4,349,869 | 9/1982 | Prett et al. | 364/165 |
| 4,355,358 | 10/1982 | Clelford et al. | 364/151 |
| 4,358,822 | 3/1982 | Sanchez | 364/151 |
| 4,368,509 | 1/1983 | Li | 364/152 |
| 4,407,013 | 9/1983 | Arcara et al. | 364/157 |
| 4,471,447 | 9/1984 | Williams et al. | 364/151 |

OTHER PUBLICATIONS

SAE Paper 800053, "GM Micro-Computer Engine Control System", by R. A. Grimm, R. J. Bremer and S. P. Stonestreet.

Primary Examiner—Charles E. Atkinson
Assistant Examiner—John R. Lastova
Attorney, Agent, or Firm—Peter Abolins; Robert D. Sanborn

[57] ABSTRACT

A controlled system (10) has a control means (12) supplying a manipulated input, Y, to a plant (14). The control means (12) has external inputs V, input control model parameters C, and a predetermined mathematical model to compute a desired controlled system output $X_D$ into Y as a function of V and C. The method for operating the controlled system (10) includes establishing an initial value for C, measuring V, and generating an initial model for generating Y from $X_D$ as a function of V and C. The method also includes correcting C as a function of the difference between $X_D$ and the actual controlled system output, X, and as a function of measured external inputs V.

1 Claim, 7 Drawing Figures

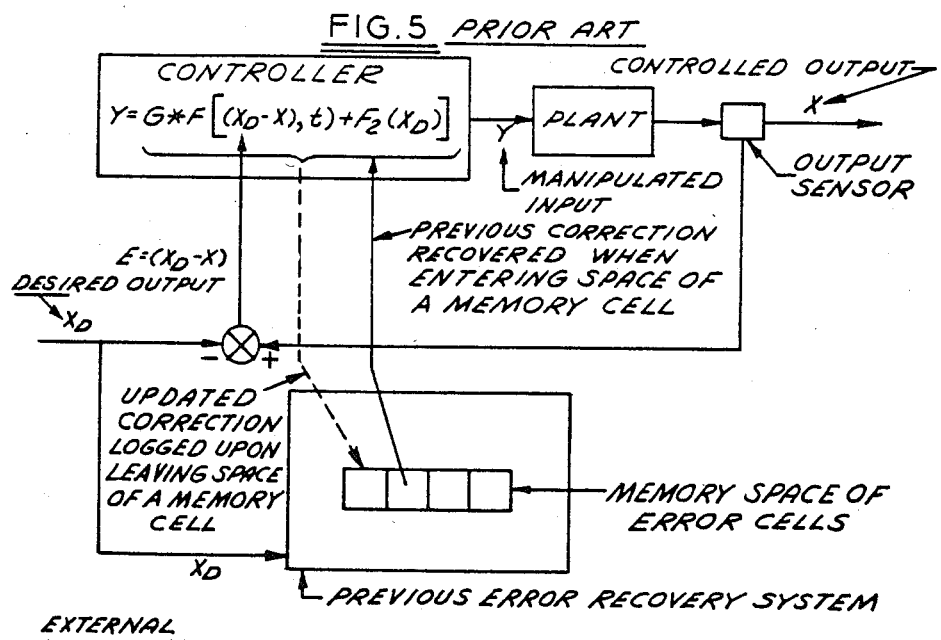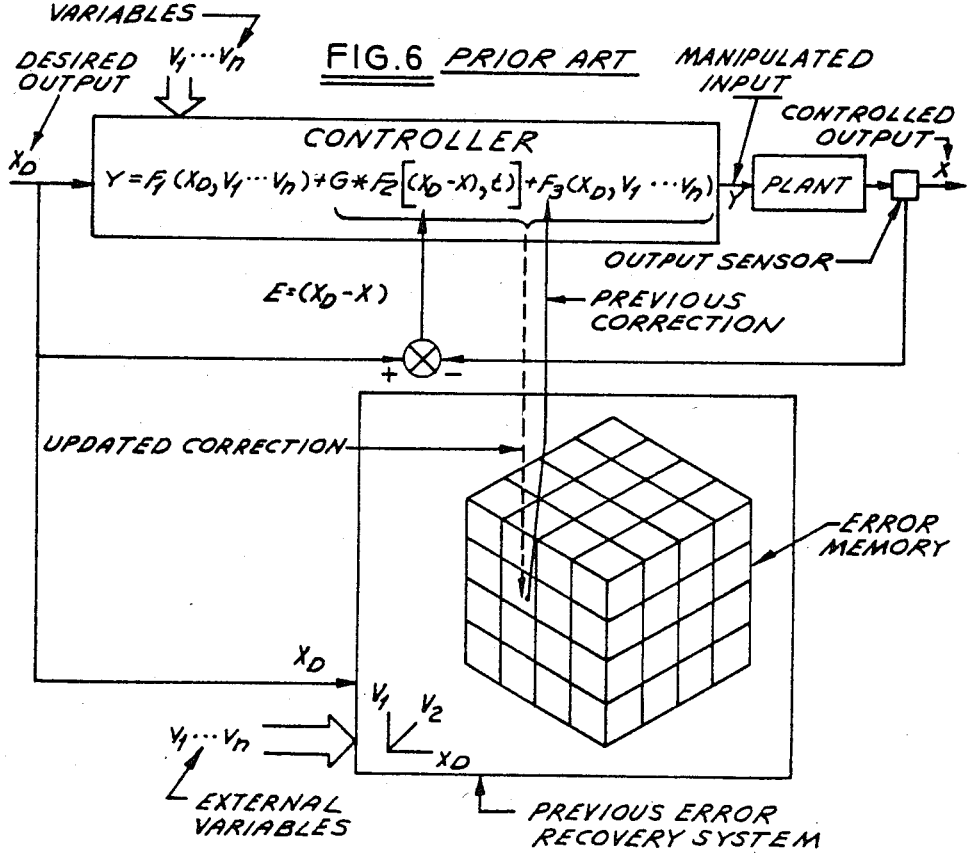

SELECTIVE PARAMETRIC SELF-CALIBRATING CONTROL SYSTEM

TECHNICAL FIELD

This invention relates to the control of a process using a control system having therein a characterization of the process.

BACKGROUND ART

A control method facilitates human control over natural and engineered mechanisms in order to regulate, command, direct and modify the behavior of these mechanisms.

The mechanism to be controlled is called the "plant". A plant is controllable when one or more known inputs to the plant can be manipulated in order to obtain consistent and predictable changes in one or more outputs of the plant. Unknown inputs to the plant have only minor effects on the controlled outputs and other outputs of the systems have only minor side effects on the environment. Controllers are required because the manipulated inputs usually are not suitable to accept the desired commands. These techniques are embodied in the mechanism known as "control systems" or "controllers".

The control systems are additions to the plants and the combination may be called a controlled system. The entire controlled system may be regarded as a signal follower system where desired output signals should be followed, with a certain degree of fidelity, by the controlled outputs in time, direction and magnitude. The physical type and dimensions of the desired output signal and the controlled output may or may not be the same. In general, the controlled output is related to the desired output by a proportionality constant which may be dimensionless or, usually, serve also as a dimensional conversion factor between the desired output and the controlled output.

Various types of control systems are known. The simple open loop control systems of the prior art include a desired output signal as input to a controller. The controller includes a mathematical model of the controlled system and defines the relationship between the desired output signal and the required manipulated input to the plant. The controller also includes means to generate the correct type and magnitude of the manipulated input signal. The manipulated input signal is directly applied to the plant which, in turn, produces the controlled output. The simple open loop system is shown on FIG. 1. Accuracy of this system primarily depends on the correctness of the control model. In general, the open loop systems tend to provide rapid response to changes in the desired output.

A control system using feedback takes into account the effect of the actual controlled system on the system input and can develop an error to correct variations of the actual system output from the desired system output. However, attempts to make such corrections can lead to dynamic problems due to instability and system response time.

The simple feedback control systems of the prior art have a feedback sensor that measures the current value of the controlled output. The feedback signal is converted to have the same physical units as the desired output signal. Both the desired output signal and the actual output feedback signal are applied to a comparator which generates an output error signal as the difference between the two signals. The error signal is the input to the controller. The controller includes an algorithm which computes values for the manipulated input to the plant proportional to the error signal or to some time dependent function of the error signal. The factor of proportionality is known as the system gain. The controller also includes means to generate the actual manipulated input. The manipulated input is directly applied to the plant which, in turn, generates the controlled output.

Accuracy of the feedback control systems fundamentally depends on the accuracy of the feedback sensor. It also depends on proper selection of the gain factor and the error function according to characteristics of the plant and the frequency domain of the desired output.

One disadvantage of the closed loop system is the time dependency of the system accuracy. The feedback signal, if improperly applied or if the feedback loop includes time delay, may induce system output instabilities and phase shifts between the desired and the actual output. Proper system stability usually necessitates reduction of the speed of system response to time variable desired output signals. This results in additional errors under dynamic operating conditions.

Since the signal path includes a closed loop, these systems are also known as closed loop sysytems. A diagram of a basic closed-loop feedback control system is illustrated on FIG. 2. The basic idea of this system is to make the manipulated input to be a function of the output error so that a greater error causes an automatic increase of the manipulated input. This tends to decrease the error between the desired output and the controlled output. One method involves change of the manipulated which generates an output error signal as the difference between the two signals. The error signal is the input to the controller. The controller includes an algorithm which computes values for the manipulated input to the plant proportional to the error signal or to some time dependent function of the error signal. The factor of proportionality is known as the system gain. The controller also includes means to generate the actual manipulated input. The manipulated input is directly applied to the plant which, in turn, generates the controlled output.

Accuracy of the feedback control systems fundamentally depends on the accuracy of the feedback sensor. It also depends on proper selection of the gain factor and the error function according to characteristics of the plant and the frequency domain of the desired output.

One disadvantage of the closed loop system is the time dependency of the system accuracy. The feedback signal, if improperly applied or if the feedback loop includes time delay, may induce system output instabilities and phase shifts between the desired and the actual output. Proper system stability usually necessitates reduction of the speed of system response to time variable desired output signals. This results in additional errors under dynamic operating conditions.

Since the signal path includes a closed loop, these systems are also known as closed loop systems. A diagram of a basic closed-loop feedback control system is illustrated on FIG. 2. The basic idea of this system is to make the manipulated input to be a function of the output error so that a greater error causes an automatic increase of the manipulated input. This tends to decrease the error between the desired output and the controlled output. One method involves change of the manipulated input proportionally to the time integral of the output error. In this system, the output error continually decreases and becomes negligible after a suitable period when constant output is demanded. The general purpose of the closed loop control systems is to improve the control accuracy beyond the capability of open loop systems or obtain control when an open loop model cannot be used.

These known control methods are disadvantageous in that they cannot maintain a rapid response while compensating for the variation in plant characteristics over time and the variation in individual plant characteristics caused by manufacture.

The prior art also developed hybrid systems in order to approach a combination of the advantages of both the open loop and the closed loop feedback control systems. These systems of the prior art may be classified as global feedback hybrid systems. In this system, an approximate value of the manipulated input is computed by an open loop control model from the magnitude of the desired output. The final magnitude of the manipulated input is typically computed as the sum of the open loop estimated value and a global feedback correction value which is generated by a closed loop system similarly to the methods applied in the simple closed loop systems. The block diagram of the global feedback or hybrid control system is shown on FIG. 3.

Advantages of the global feedback hybrid systems include fast system response within the accuracy of the open loop model and high closed loop accuracy when the desired output is only slowly variable.

Inherent problems of the global feedback hybrid systems are open loop errors with highly variable desired outputs and susceptibility to closed loop instabilities.

The prior art includes externally adaptive versions of the above control system types. In the externally adaptive open loop systems, the control model is a function of input variables provided by additional input sensors. In the externally adaptive feedback system, the system gain is calculated as a function of input variables. In the externally adaptive global feedback hybrid systems, both the control model and the system gain may be functions of input variables.

An externally adaptive hybrid control system with additional global feedback correction is shown in FIG. 4 which illustrates the use of external adaptive features both in the open loop model and in the feedback system gain factor.

Alternate adaptive methods have been applied by the prior art in feedback control systems in order to further improve the speed of response based on previous experiences of the system. An example of a simple internally adaptive feedback system is shown in FIG. 5.

The internally adaptive method of the prior art is a global self correcting method. The multidimensional operating space as defined by the desired input and the major input variables is divided up into incremental cells. Each one of the cells is assigned to a memory location in the control computer. During normal operation of the feedback or hybrid systems, the global feedback corrections attained while the system operates for a suitable time period within the range of each cell are saved in the memory locations assigned to the cells. After suitable period of operation, the memory of a number of cells are filled with the latest corrections that have been previously provided by the feedback. Memory location of cells which have not been reached previously by the system have zero initial correction values.

As the system continues to operate and enters the region of a previously updated cell, the previously used global correction value is recovered and used as an additive-quantity to the current global feedback correction. Usually, the previous global correction is adequate and the feedback provides zero additional correction. The feedback correction will be other than zero if a drift occurred in the calibration of the system component. Upon leaving the cell, the sum of the previous correction and the current feedback correction is stored in the cell memory. This insures that the correction memory is continuously updated.

The same principles of the internally adaptive self correcting method can also be applied to hybrid systems. An example of this application is shown in FIG. 6. The self correcting internally adaptive systems operate with improved fidelity without substantial time delays that would occur if only feedback correction was available and without the open loop model errors provided that the correction memory cells are suitably filled and updated. The fast system response is obtained because the system converts itself into a highly corrected open loop controller after the self correction takes place since the closed loop is practically inactive and it merely updates the error memories for slow drifts in the components.

A disadvantage of this self correcting method is that usually a large error memory is required in order to ensure sufficient table resolution. The required period of error data correction is relatively long because portions of the logged error can be incorrect, interpollation between the error cells or across unfilled regions is not well defined and requires substantial software. Extrapolation of the error data into unfilled cells is difficult and the update of already filled cells tends to be slow.

The self-correcting method is most appropriate when a satisfactory mathematical control model of the plant is not available. Then the error memory provides the functions of an open loop model in feedback systems and it supplements the inadequacies of the control model in hybrid systems. However, the system inputs should sweep through their entire range of operation frequently in order to suitably update the error memory.

DISCLOSURE OF THE INVENTION

The self-calibrating control methods in accordance with an embodiment of this invention are also internally adaptive systems and provide fast response with high fidelity. However, clear and significant differences exist compared to the prior art which provide solutions to the shortcomings of the prior art.

This internally adaptive self-calibrating method has a hybrid controller structure with an open loop parametric control model and an output feedback sensor. The self-calibration method provides internally adaptive characteristics through continued recalibration of each one of the open loop model parameters to their correct value rather than providing a multidimensional global correction of the open loop model of a self-correcting system.

The control means in accordance with this invention produces a controller manipulated input to the plant as a function of a desired output, $X_D$, a first plurality of external inputs designated V, characterizing environmental conditions and measurable by sensing means, and as a function of a second plurality of controller model parameters designated C, alterable in said system by calibration means as a function of controlled system output. The control means is identified with a predetermined mathematical model to compute a manipulated system input Y as a function of V, C, and desired $X_D$.

A method for operating the control means to meet specified system output requirements comprises the steps of establishing an initial value for controller model parameters C, measuring external inputs V, generating an initial model for generating a manipulated system input Y from a desired controlled system output, $X_D$, as a function of V and C, and correcting the control model parameters as a function of measured external inputs V and the error between the actual and desired output $(X-X_D)$.

This control method can improve the fidelity between the desired outputs and the controlled actual outputs in control systems and regulators under all dynamic conditions compared to the prior art with practical methods which are suitable for implementation by the electronic control technology including digitial computers.

This control method utilizes a feedback signal for individual readjustment of each of the parameters of the open loop control model of the plant. The model is adequately accurate to provide for the computation of the correct manipulated input of the plant from the desired output signal and other measured input variables provided that the model parameters have their correct values. The readjustment of the model parameters is carried out individually, one parameter at a time. The parameter to be updated is chosen by a predefined selective process.

This system achieves a high fidelity between the desired output signal and the controlled output because the feedback continuously updates the parameters to their correct value thereby eliminating the initial component tolerance problems and any further drifts in component calibration. In addition, the system is also correct for changes in slowly changing unmeasured environmental variables provided that the variables are implemented as parameters of the model. Selective individual feedback into the parameters eliminates feedback instabilities in the active regions outside the regions of system saturation. In ordinary closed loop feedback systems instability, phase shifts and attenuation in the active regions is common. Within the regions of saturation, in the self-calibrating system output trajectories can be controlled because the correct system model is well defined. Consequently, response delays in the system are minimized except for saturated conditions. Such saturated conditions are due to a lack of capacity of the plant or the manipulated input driver to follow extremely rapid changes in the desired output and are not due to an inability of the control system to follow the input. Under conditions of saturation, system time delays exist, but dynamic instability problems can be avoided.

In accordance with this invention, a selective parameteric self-calibrating control system provides the properties at an open loop control system which is always in a state of accurate calibration beyond the capabilities of the open loop control systems of the prior art.

The update of the individual parameters by feedback information in this method provides inherently self-calibrating internally adaptive properties.

BRIEF DESCRIPTION OF THE DRAWING

FIG. 5 is a block diagram of a prior art internally adaptive self-correcting control system;

FIG. 6 is a block diagram of a prior art externally and internally adaptive self-correcting control system.

BEST MODE FOR CARRYING OUT THE INVENTION

Figure 1:
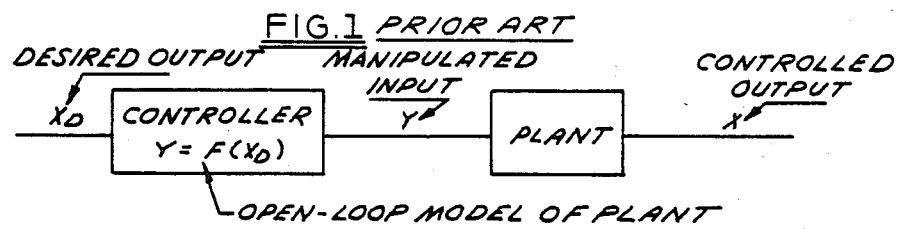
FIG. 1 is a block diagram of a prior art open loop control system.
Figure 2:
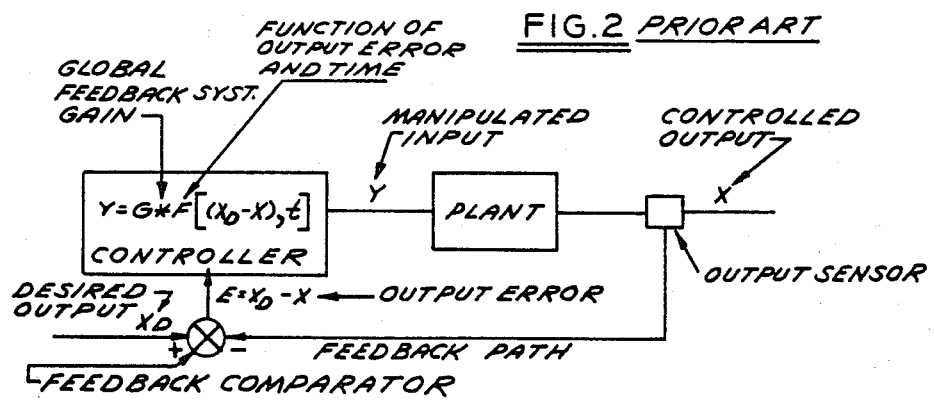
FIG. 2 is a block diagram of a prior art closed loop control system.
Figure 3:
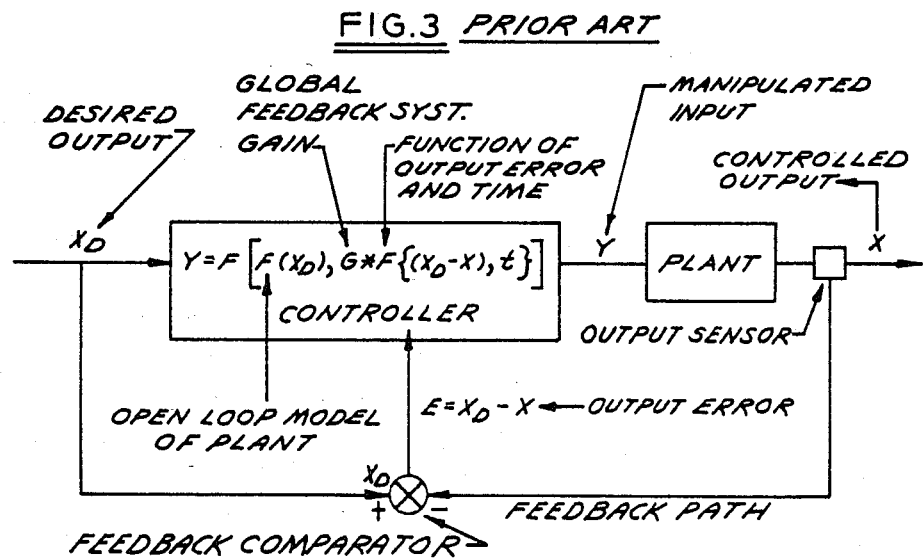
FIG. 3 is a block diagram of a prior art global feedback hybrid control system.
Figure 4:
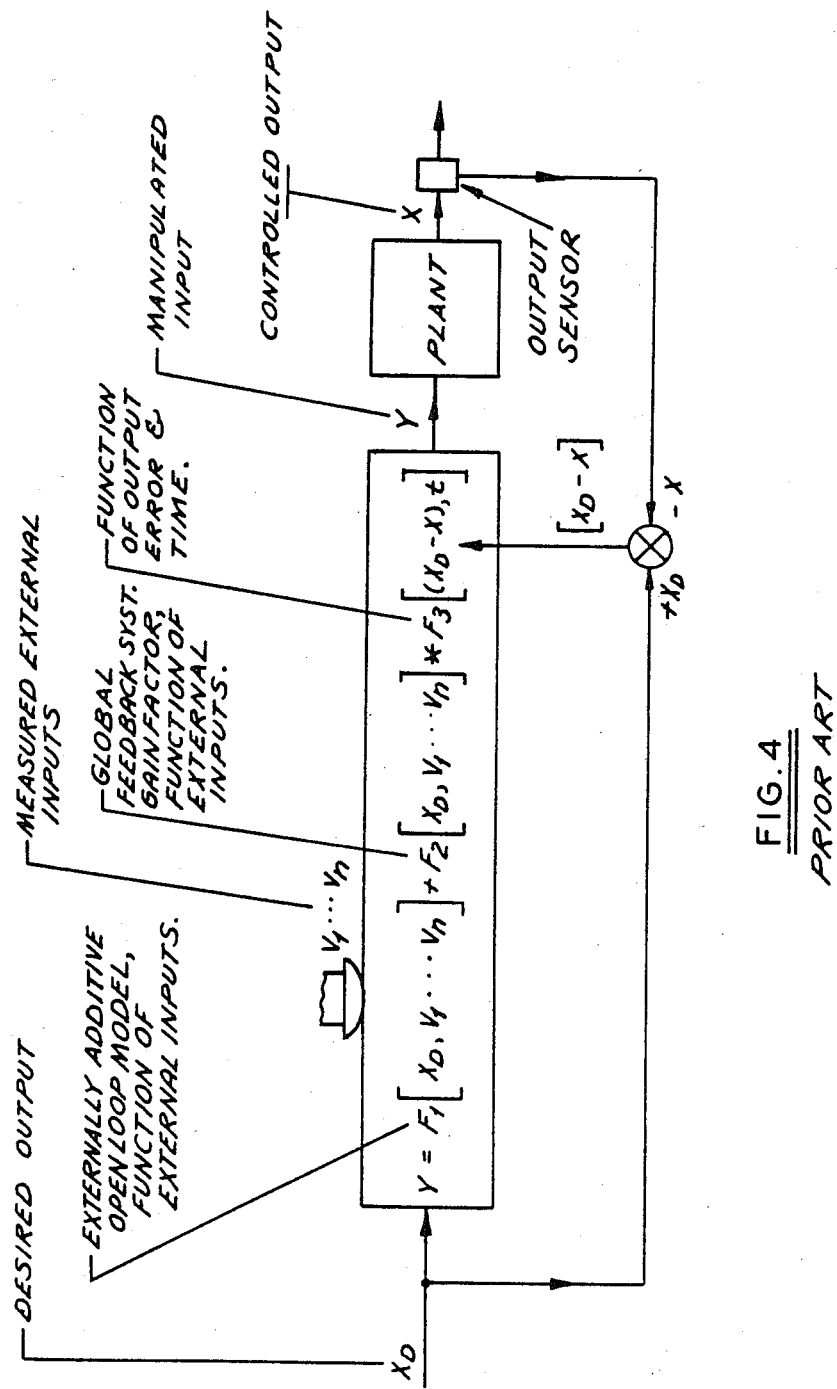
FIG. 4 is a block diagram of a prior art externally adaptive hybrid control system.
Figure 7:
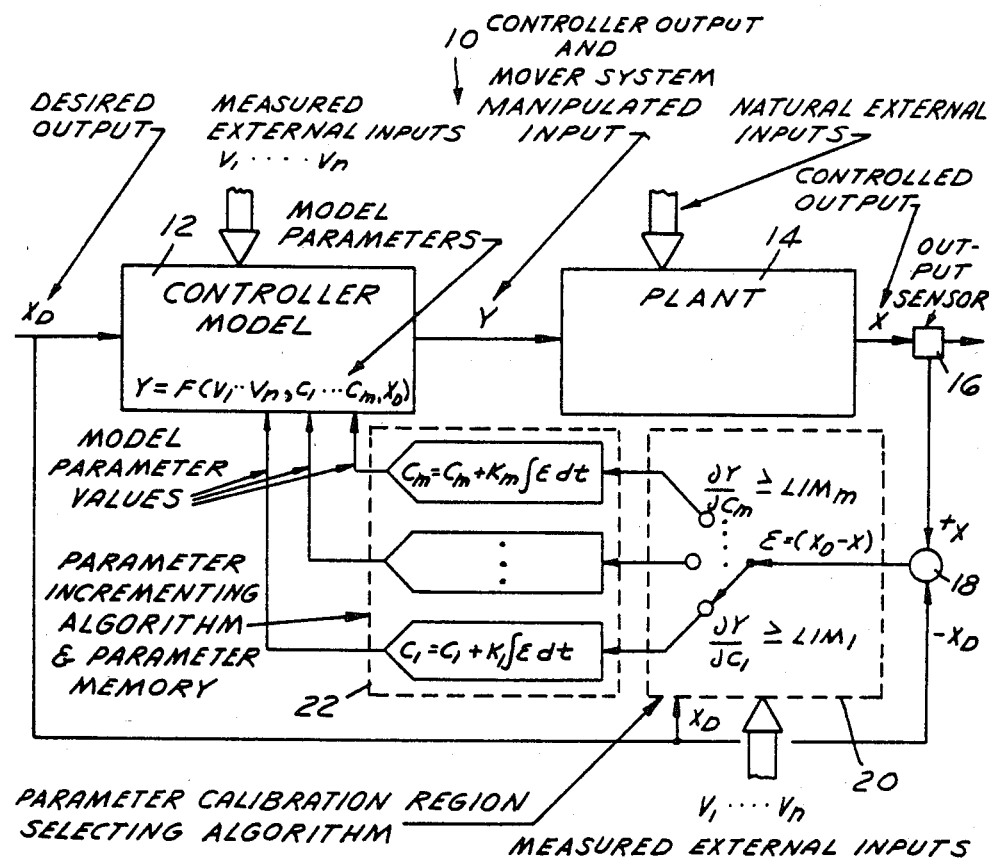
FIG. 7 is a block diagram of a control system in accordance with an embodiment of this invention including a feedback path for adjusting the magnitude of the model parameters of a controller applying an input to a plant.

Referring to FIG. 7, a controlled system 10 includes a controller 12 having as a controller input the desired controlled system output and as a controller output the manipulated input for a plant 14. Plant 14 is part of controlled system 10 and has as an input the controller output which is manipulated by controller 12. An output sensor 16 receives the actual controlled system output of plant 14. A comparator 18 receives a positive input from output sensor 16 and a negative input from the input of controller 12. The output of comparator 18 is an output error which is applied to a parameter selector 20, which selects which controller model parameter is to be adjusted to reduce the output error. The output of parameter selector 20 is applied to the input of a parameter incrementer 22 so as to change the value of the selected model parameter. Outputs from parameter incrementer 22 are applied to controller 12 to change the model parameter values in the controller model. Controller 12 also has as inputs the measured external inputs, $V_1$, $V_2$, . . . $V_n$. Similarly, measured external inputs $V_1$ through $V_n$ are applied to parameter selector 20 to determine the sequence of adjustment of model parameters. The measured external inputs $V_1$, $V_2$, . . . $V_n$ are selected to characterize the natural external inputs which are applied to plant 14 and which affect the operation of plant 14.

In operation, controlled system 10 uses an open loop parameteric mathematical model in controller 12 which has adaptive external inputs. The model provides values for the manipulated input for plant 14 based on the desired controlled system output of plant 14. The initial manipulated input may have initial errors caused by component tolerances and unmeasured external inputs. These inaccuracies are reflected in errors of the controller model parameters. The open loop controller 12 is supplemented with a selective parameteric feedback loop including output sensor 16, comparator 18, parameter selector 20 and parameter incrementer 22. This feedback loop provides ongoing correction for the model parameters one at a time by a successive approximation process (e.g. by an integral incrementing process) using control computer software and memory. In accordance with this process, there is rapid convergence of the parameters to their correct values.

In order to provide rapid improvement of the control model, each model parameter is selected for the feedback update under operating conditions when it has the greatest absolute effect on the manipulated input. The effect of a parameter is indicated by the partial derivative of the manipulated input with respect to the parameter. The partial derivative shows the magnitude of change of the manipulated input due to a unity increment in the parameter value. The magnitude of this derivative is a function of the input variables, the model parameters, and the desired output, and it has its greatest values usually within only a portion of the operating variable space of the system. Each model parameter usually has its greatest effect under a unique set of operating conditions that is well separated from that of the other parameters. Consequently, the total operating variable space of the system can be pre-divided into regions where each parameter has the greatest effect on the manipulated input.

Accordingly, the operating ranges of the desired controlled system output and the measured external variables are divided into as many regions as the number of controlled model parameters. Each parameter is assigned to one of the regions such that the region includes the highest absolute values of the partial derivative of the manipulated controlled system input with respect to the assigned parameter. As a result, a particular operating region of the system variable space is associated with a particular model parameter having the greatest effect on the manipulated controlled system input and therefore on the controlled system output.

During normal operation, the partial derivatives are evaluated and compared to region limits by a parameter region selection algorithm provided in parameter selector 20. That is, the partial derivative of the controller model output is taken with respect to each of the model parameters and compared with an associated predetermined limit. The partial derivative which has greater absolute value than the associated predetermined limit determine which associated model parameter will be selected to be incremented. The selected parameter is gradually incremented by a method using integration contained in parameter incrementer 22, until either an intermediate stable value is obtained or another parameter is selected for updating. Thus, incrementing the previous value of the control parameter by an amount proportional to the integral of the output error during a predetermined period of time is expressed as: $C(1) = C(0) + K \int \epsilon \, dt$ wherein:

C(1) is the updated parameter
C(0) is the previous parameter
K is a constant
$\epsilon$ is the output error defined by the difference between the actual and the desired controlled system output.

The incrementing method is illustrated in FIG. 7, and determines a new value of a model parameter by adding to the previous model parameter the magnitude of the time integral of the error, $\epsilon$, multiplied by a predetermined constant. The time integral is taken over a sampling period. Subsequent updates of all of the parameters result in a highly accurate open loop controller model resulting in an overall system transfer function magnitude which is nearly equal to numerical one when operating within the nonsaturated range of system operation.

The parameter region selection algorithm provides for selection of a model parameter, C, to be updated on the basis of the current magnitudes of the differences between the value of the partial derivatives of the manipulated input with respect to the different model parameters, C's, and associated predetermined limits of the different operating ranges of the system variables.

Boundaries of the calibration regions may be arbitrarily defined to balance out update time between regions. However, each region should include the larger, more significant, values of the associated partial derivative. The region boundaries may be defined by predetermined values of each partial derivative or by values of system variables or any other convenient methods.

As a result, there are minimized the effects of component tolerances and aging on a model based control system under both steady state and transient conditions.

Various modifications and variations will no doubt occur to those skilled in the arts to which this invention pertains. For example, the particular choice of parameters to be adjusted or compensated may be varied from that disclosed herein. These and all other variations which basically rely on the teachings through which this disclosure has advanced the art are properly considered within the scope of this invention.

We claim:

1. In a controlled system having a control means supplying a manipulated input to a plant, said control means having a first plurality of external inputs designated V, measurable by sensing means, and a second plurality of input control model parameters designated C, alterable in said controlled system by calibration means, said control means including a predetermined mathematical model to compute a desired controlled system output $X_D$ into a manipulated input Y as a function of V and C, a method for operating the controlled system to meet specified system output requirements comprising the steps of:

establishing an initial value for input control parameters, C;

measuring external inputs, V;

generating an initial model for generating a manipulated input, Y, from a desired controlled system output, $X_D$, as a function of V and C; and correcting the input control model parameters C as a function of the difference between the desired controlled system output $X_D$ and the actual controlled system output, X, and as a function of measured external inputs, V, by including the steps of comparing the actual controlled system output to the desired controlled system output and generating an output error; measuring external inputs V; and updating sequentially the values of the input control parameters as a function of output error and measured external inputs, V;

said step of updating sequentially including:

selecting the input control parameter having the largest contribution to the output error, by taking the partial derivative of the manipulated input, Y, with respect to each of the input control parameters; determining whether each of the partial derivatives is within predetermined boundaries; selecting to adjust the value of that input control parameter associated with the largest partial derivative; and adjusting the value of the selected input control parameter to reduce the output error, by incrementing the previous value of the control parameter by an amount proportional to the integral of the output error during a predetermined period of time, so that $C(1) = C(0) + K \int \epsilon \, dt$ wherein C(1) is the updated parameter
C(0) is the previous parameter
K is a constant
$\epsilon$ is the output error defined by the difference between the actual and the desired controlled system output.

* * * * *